US010498454B1

(12) United States Patent
Anderson et al.

(10) Patent No.: US 10,498,454 B1
(45) Date of Patent: Dec. 3, 2019

(54) EXTINCTION RATIO IMPROVEMENTS IN SILICON PHOTONICS

(71) Applicant: Cisco Technology, Inc., San Jose, CA (US)

(72) Inventors: Sean P. Anderson, Macungie, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/024,677

(22) Filed: Jun. 29, 2018

(51) Int. Cl.
H04B 10/50 (2013.01)
H04B 10/54 (2013.01)
H04B 10/073 (2013.01)
G02F 1/313 (2006.01)
G02F 1/225 (2006.01)
H04Q 11/00 (2006.01)

(52) U.S. Cl.
CPC ....... H04B 10/5053 (2013.01); G02F 1/2257 (2013.01); G02F 1/3138 (2013.01); H04B 10/0731 (2013.01); H04B 10/54 (2013.01); H04Q 11/0005 (2013.01)

(58) Field of Classification Search
CPC ............ H04B 10/073; H04B 10/0731; H04B 10/503; H04B 10/5053; H04B 10/54; G02F 1/212; G02F 1/225; G02F 1/2257; G02F 1/313–3138; G02F 2001/212
See application file for complete search history.

(56) References Cited

U.S. PATENT DOCUMENTS

| 5,044,715 A | * | 9/1991 | Kawachi | ............ G02B 6/12004 |
| | | | | 385/14 |
| 2010/0150495 A1 | * | 6/2010 | Kawanishi | ............ G02F 1/3137 |
| | | | | 385/3 |
| 2014/0355979 A1 | * | 12/2014 | Dorin | ................. H04Q 11/0005 |
| | | | | 398/27 |

OTHER PUBLICATIONS

David A.B. Miller, "Perfect Optics With Imperfect Components," Optica, vol. 2, No. 8, Aug. 2015, 4 pages.
D.A.B. Miller, "Self-Configuring Universal Linear Optical Component," Ginzton Laboratory, Stanford University, 2013, 29 pages.
Liu et al.,"Planar Waveguide Moire GratingPlanar Waveguide Moire Grating," Optics Express, vol. 25, No. 21, Oct. 16, 2017, 14 pages.

* cited by examiner

Primary Examiner — Casey L Kretzer
(74) Attorney, Agent, or Firm — Patterson + Sheridan, LLP

(57) ABSTRACT

Improvements in extinguishing optical signals in silicon photonics may be achieved by supplying a test signal of a known characteristics to a Photonic Element (PE) to extinguish the test signal via a first phase shifter and intensity modulator on a first arm of the PE and a second phase shifter and intensity modulator on a second arm of the PE; sweeping through a plurality of voltages at the first intensity modulator to identify a first voltage that is associated with an extinction ratio at an output of the PE that satisfies an induced loss threshold and a second voltage that is associated with an induced loss in the test signal at the output of the PE that satisfies an extinction ratio threshold; and setting the PE to provide an operational voltage to the first intensity modulator based on the first voltage and the second voltage.

12 Claims, 6 Drawing Sheets

EXTINCTION RATIO IMPROVEMENTS IN SILICON PHOTONICS

TECHNICAL FIELD

Embodiments presented in this disclosure generally relate to silicon photonics and improvements to an extinction ratio for optical signals transmitted therein.

BACKGROUND

In various photonic circuit elements, such as switches, modulators, and Variable Optical Attenuators (VOA), input optical signals are split and/or combined to produce various output optical signals of desired amplitudes. Extinction of an optical signal may occur by splitting an input optical signal into two signals and combining the two signals to interfere with one another so that an output optical signal has a reduced amplitude from that of the input optical signal. An extinction ratio ($r_e$) can be calculated based on the relative amplitude of the output optical signal to the input optical signal, which may be presented as a fraction, a percentage, or in decibels based on the amplitudes of the inputs and outputs (e.g., $r_e = A_{output}/A_{input}$). In several photonic circuits, it is desirable to produce an output signal such that $r_e$ is below a threshold, so that downstream circuit elements are not inadvertently activated and so that carrier waves are suppressed for signal analysis.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
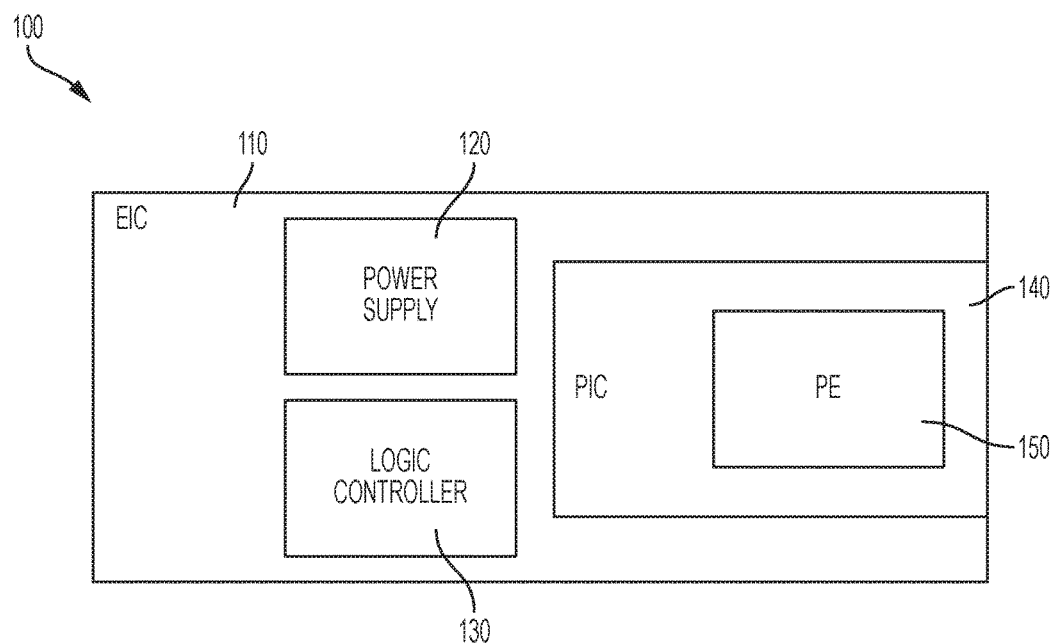
FIG. 1 illustrates an example optoelectronic circuit according to an aspect of the present disclosure.

One embodiment presented in this disclosure provides a Photonic Element (PE), comprising: an input, configured to receive an input optical signal and split the input optical signal into a first partial signal and a second partial signal; a first arm connected to the input and configured to receive the first partial signal, the first arm including: a first phase shifter; and a first intensity modulator configured to provide a first matched signal based on the first partial signal; a second arm connected to the input and configured to receive the second partial signal, including: a second phase shifter, wherein the second phase shifter is configured to operate with the first phase shifter to phase offset the first partial signal relative to the second partial signal; and a second intensity modulator configured to provide a second matched signal based on the second partial signal, wherein only the second intensity modulator is provided power to actively reduce the second matched signal from the second partial signal; and an output, connected to the first arm and the second arm and configured to combine the first matched signal and the second matched signal to provide an output signal.

Another embodiment presented in this disclosure provides a method comprising: supplying a test signal of a known wavelength and a known amplitude to a Photonic Element (PE) to extinguish the test signal via a first phase shifter and a first intensity modulator on a first arm of the PE and a second phase shifter and a second intensity modulator on a second arm of the PE; sweeping through a plurality of voltages at the first intensity modulator to identify a first voltage of the plurality of voltages that is associated with an extinction ratio at an output of the PE that satisfies an induced loss threshold and a second voltage of the plurality of voltages that is associated with an induced loss in the test signal at the output of the PE that satisfies an extinction ratio threshold; and setting the PE to provide an operational voltage to the first intensity modulator based on the first voltage and the second voltage.

A further embodiment presented in this disclosure provides a Photonic Element comprising: a first arm in parallel with a second arm, wherein the first arm is configured to carry a first signal to combine with a second signal carried by the second arm; a phase shifter disposed in the first arm, configured to offset a phase of the first signal by $1\pi$ radians relative to the second signal; and an intensity modulator disposed in the first arm, configured to induce an amplitude loss in the first signal such that when the first signal is combined with the second signal a resulting combined signal has an amplitude below an extinction ratio threshold.

Example Embodiments

The present disclosure provides systems and methods for improving extinction ratios in silicon photonic elements. In optical signaling, to extinguish an optical signal, that signal is split into two components, where the split signals are phase shifted by $1\pi$ radians (i.e., 180°) from each other and recombined, so that one signal (ideally) cancels out the other. For example, a sinusoidal signal with an amplitude of 1 W may be split into two signals, each with an amplitude of 0.5 W and a sinusoidal waveform. If the two split signals are offset from each other by $1\pi$ radians, at every phase position in the waveform, the amplitude of a combined signal ideally is 0 W (i.e., $Amplitude_{split1} + Amplitude_{split2} = Amplitude_{combined} = 0$).

In practice, however, beam splitters and transmission media within optical circuits have different loss ratios, which can lead to a combined signal with an amplitude other than 0 W. For example, if a Y-splitter (also referred to as a Y-combiner, depending on a mode of operation) does not evenly split the power of a received signal, one splitting arm would carry more power than the other splitting arm. Similarly, if one pathway in the photonic element induces a first loss on the split signal that is carried thereon, and a second pathway induces a second, different loss of on the split signal that is carried thereon, the amplitudes of split signals may not equal zero when recombined.

To account for the physical differences in splitting/combining hardware and transmission media, downstream systems (e.g., optoelectronic devices that receive the output of a recombined signal) may set higher activation or detection potentials, manufacturers may set tighter tolerances on the fabrication of splitting/combining hardware and transmission media (e.g., more even splits in Y-splitter and couplers), resonant devices (e.g., photonic rings), etc. These approaches are often cost intensive (i.e., are associated with high scrap/failure rates), wavelength dependent, and induce high insertion losses or back reflection in optoelectronic devices. The present disclosure provides systems and methods for the use of inserted intensity modulators that provide a small, actively-controlled loss in signal strength of one split signals to compensate for fabrication imperfections at time of test/calibration. The intensity modulators used according to the present disclosure may reduce scrap/failure rates, are not wavelength dependent, and do not induce high insertion losses or back reflection.

FIG. 1 illustrates an example optoelectronic circuit 100. As illustrated, the optoelectronic circuit 100 includes an Electrical Integrated Circuit (EIC) 110, a power supply 120, a logic controller 130, a Photonic Integrated Circuit (PIC) 140, and Photonic Element (PE) 150. An optoelectronic circuit 100 may include other components in addition to those illustrated, which have been omitted so as not to distract from the novelty of the present disclosure.

The EIC 110 includes a substrate (such as silicon) in which the other components are electrically coupled to one another via various traces, wires, vias, and intermediary components. The other components may be embedded in the substrate or connected to the EIC 110 via one or more of solder pads, epoxy, and wire bonding.

The power supply 120 includes one or more power sources integrated into the EIC 110 or connections made to power sources linked externally from the EIC 110. Examples of power sources include, but are not limited to: batteries, solar cells, Alternating Current (AC) to Direct Current (DC) converters linked to external current sources, DC to AC converters linked to external current sources, power conditioners, transformers, and the like. The power supply 120 provides power to the various components of the EIC 110, including the processor 130, the PIC 140, and the PE 150.

The processor 130 includes logic used to control the various components of the optoelectronic circuit 100 and to send/receive optical signals via the PIC 140 and PE 150. In various embodiments, the processor 130 is used in conjunction with an external processor or controller for test or calibration of the optoelectronic circuit 100. The processor 130 may include programmable, hardwired, or "burned in" logic to control the operation of the optoelectronic circuit 100, and may include non-transitory computer storage media to store data or logic in a computable readable format.

The PIC 140 may include a diode activated by an optical signal received externally from the optoelectronic circuit 100, a laser source to produce optical signals that are transmitted from the optoelectronic circuit 100, and additional components to convert electrical signals to/from optical signals. The PIC 140 includes the PE 150, which may include an optical extinguisher to extinguish optical signals and/or switches to select between optical signals to send/receive. The optical extinguisher of the PE 150 receives an optical signal, splits the optical signal into two parts, phase shifts the two parts of the optical signal and combines those parts to provide an output optical signal with an amplitude below the activation threshold for downstream devices. In some embodiments, the optical extinguisher 150 may include switches at input and/or output that receive/transmit multiple optical signals. The switches may designate which optical signal of several received optical signals is to be extinguished, or may designate which downstream device is to be transmitted an extinguished optical signal versus an un-extinguished or reconstructed optical signal.

FIGS. 2-5 each illustrate various examples of a PE 150, which may be a component included in the PIC 140 to extinguish or select between optical signals with improved extinction ratios and low insertion losses according to aspects of the present disclosure. In each of the FIGS. 2-5, several physical components are illustrated that may carry an optical signal. For ease of understanding, various illustrations of the optical signals that are discussed as being carried on specific portions of the PE 150 are also illustrated with exemplary amplitudes. Signals with various different amplitudes (including zero amplitude; or no signal) and in different ratios than those illustrated addition are envisioned.

Each of the example PEs 150 are illustrated with sections that include: an input 210, an output 230, a first arm 220a (generally, arm 220) running between the input 210 and the output 230, and a second arm 220b running between the input 210 and the output 230 in parallel with the first arm 220a. More arms 220 than illustrated may be used in various embodiments with inputs 210 and outputs 230 having a correspondingly different splitting/combining ratio matched with one another within the PE 150.

Each arm 220 of the PEs 150 includes a phase shifter 221, which is a physical component that shifts the phase of a signal carried through that component. The embodiments herein can be used with various types of phase shifters 221 (both passive and active) to affect the phase of a signal carried in a given arm 220, which may operate based on varying principals. For example, a thermo-optic phase shifter 221 applies a controlled temperature to the transmission path of the arm 220 through which a signal is transmitted to affect a phase at which the signal exits the phase shifter 221. In some embodiments, the phase shifter 221 may be an electro-optic material, such as lithium niobate. Each phase shifter 221 ideally affects only the phase of signals passed therethrough, but in operation some losses in amplitude may be experienced, and different phase shifters 221 may impart different losses.

In a two-arm PE 150, a first phase shifter 221a (included in a first arm 220a) and a second phase shifter 221b (included in a second arm 220b) may each be configured to impart up to a $2\pi$ radian shift in a signal carried on a respective arm 220. One or both of the phase shifters 221 may be engaged to affect a phase shift on a respective arm 220 so that signals, when re-combined at the output 230, are aligned at desired phases with one another. By shifting the relative phases of signals carried on parallel arms 220, the phase shifters 221 align the respective signals to cause destructive or constructive interference; extinguishing or amplifying the amplitude of one or more signals.

Each arm 220 of the illustrated PEs 150 also includes an intensity modulator 222, which affects a loss in the amplitude of a signal carried through that component. Each intensity modulator 222 includes an active portion, which imparts a controlled, variable loss to the amplitude based on a supplied voltage, and may optionally include passive portions to affect the amplitude without power input. In addition to amplitude modulation, an intensity modulator 222 may also induce phase modulation to signals carried through that component, which may be accounted for (and counteracted) when configuring the phase modulators 221 (from a DC or low speed perspective).

For example, a variable portion may be a low-doped semiconductor in a semiconductor-insulator-semiconductor-capacitor (SISCAP) arrangement that imparts a variable drop in optical signal strength. In other examples, a forward-biased PIN diode or a reverse biased PN junction device may be used in the intensity modulator 222. During operation, a power supply 120 may power a first intensity modulator 222a and leave a second intensity modulator 222b unpowered so that the signal carried on the first arm 220a is reduced in amplitude to match the signal carried on the second arm 220b. Including an intensity modulator 222 in an arm induces a small loss in optical signal amplitude, even if not powered, but the loss imparted by an active intensity modulator 222 may be set so as to offset the loss of an inactive intensity modulator 222. Similarly, an intensity modulator 222 can be selected to match to the transmission medium of the arm 220 such that passive losses may be minimized (e.g., kept at or below about 0.1 dB).

In some embodiments, a high-speed modulator 223 is included on the arms 220 to phase modulate optical signals with high frequencies/short wavelengths (e.g., radio frequency signals) in conjunction with the Direct Current/low-speed modulation provided by the phase shifters 221. In a two-arm PE 150, a first high-speed modulator shifter 223a (included in a first arm 220a) and a high-speed modulator 223b (included in a second arm 220b) may each be configured to impart up to a $2\pi$ radian shift in a high-speed signal carried on a respective arm 220. One or both of the phase shifters 221 may be engaged to affect a phase shift on a respective arm 220 so that high-speed signals, when recombined at the output 230, are aligned at desired phases with one another. By shifting the relative phases of high-speed signals carried on parallel arms 220, the high-speed modulators 221 align the respective signals to cause destructive or constructive interference; extinguishing or amplifying the amplitude of one or more high-speed signals. Each high-speed modulator 223 ideally affects only the phase of signals passed therethrough, but in operation some residual losses in amplitude may be experienced, and different phase shifters 221 may impart different losses that may be accounted for by the intensity modulators 222. The high-speed modulator 223 may be a high-doped semiconductor that is part of a radio frequency data modulator, a Mach-Zehnder Interferometer, a high-frequency phase shifting device, or the like. In some embodiments, the PE 150 may omit high-speed modulators 223, or may integrate high-speed modulators 223 into the phase shifters 221. Additionally, several high-speed modulators 223 may be included on each arm 220, with each high-speed modulator 223 driven by a different modulation signal to affect different portions of the signal carried on the arm 220. For example, the phase shifter 221 may phase shift portions of the signal from 0 Hz to about X Hz, a first high-speed modulator 223 on the same arm 220 as the phase shifter 221 may phase shift portions of the signal from about X Hz (e.g., 100 kHz) to about Y Hz (e.g., 100 GHz), and a second high-speed modulator 223 on the same arm 220 may phase shift portions of the signal from about Y Hz to about Z Hz.

Although shown with the phase shifter 221 and the high-speed modulator 223 upstream from the intensity modulator 222, the order of phase shifters 221, high-speed modulator 223, and intensity modulators 222 in a given arm 220 may be altered. In one embodiment, a first arm 220a includes a first phase shifter 221a upstream from an included first intensity modulator 222a which is upstream from a first high-speed modulator 223a, whereas the second arm 220b (of the same PE 150 or a different PE 150) includes a second phase shifter 221b downstream from an included second intensity modulator 222b that is downstream from an included second high-speed modulator 223b.

The power supply 120 included in an optoelectronic circuit 100 in which the PE 150 is a part of may be connected to each of the phase shifters 221 and intensity modulators 222. The power supply 120 may provide power of a regulated amount to shift the phase of a signal on one or more arms 220 or to reduce the amplitude of a signal on one arm 220.

Figure 2:
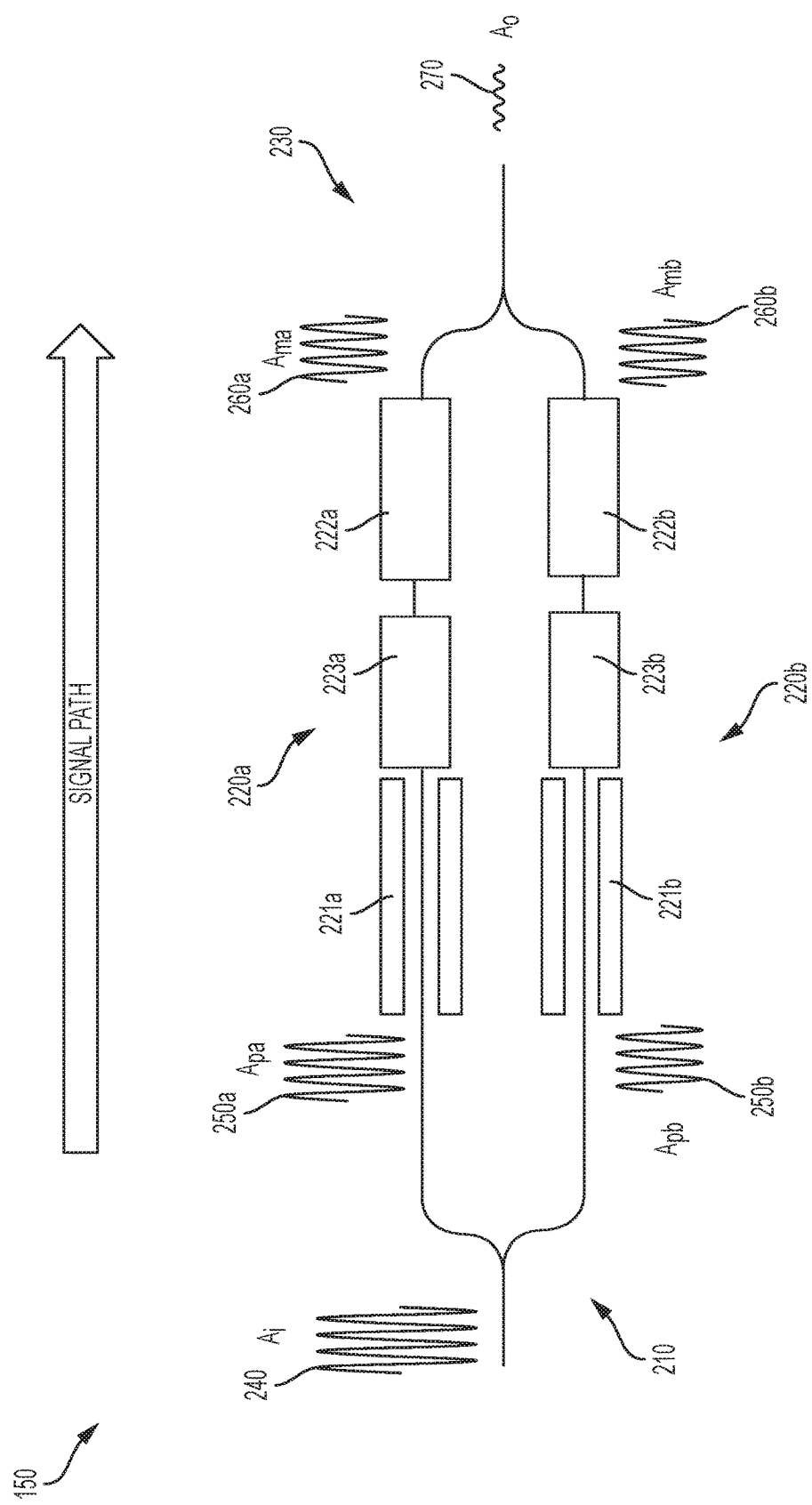
FIG. 2 illustrates an example photonic element with one input and one output according to an aspect of the present disclosure.

FIG. 2 illustrates an example PE 150 with one input 210 and one output 230. The input 210 of the example PE 150 in FIG. 2 is a Y-splitter (in a 1:2 ratio), and the output 230 is a Y-combiner (in a 2:1 ratio). Between the input 210 and the output 230, are two arms 220, each with a phase shifter 221, a high-speed modulator 223, and an intensity modulator 222.

An input signal 240 of amplitude $A_i$ is received at the input 210 and is split onto the first arm 220a as a first partial signal 250a (generally, partial signal 250) with an amplitude $A_{pa}$ and is split onto the second arm 220b as a second partial signal 250b with an amplitude of $A_{pb}$. As illustrated, $A_{pa}$ is greater than $A_{pb}$, and is phase aligned with one another. The one or both of the first phase shifter 221a and the second phase shifter 221b may induce a phase offset between the first partial signal 250a and the second partial signal 250b. Similarly, (if included) one or both of the first high-speed modulator 223a and the second high-speed modulator 223b may induce a phase offset between the high-frequency components of the first partial signal 250a and the second partial signal 250b.

During operation, the power supply 120 provides one of the first intensity modulator 222a and the second intensity modulator 222b a voltage to induce a loss in one of the partial signals 250. The first arm 220a provides a first matched signal 260a (generally, matched signal 260) of amplitude $A_{ma}$ to the output 230, and the second arm 220b provides a second matched signal 260b of amplitude $A_{mb}$ to the output 230 to be combined into an output signal 270 of amplitude $A_o$. In one embodiment, one of the intensity modulators 222 induces a loss into a respective partial signal 250 to account for an uneven split ratio at the input 210 of the input signal 240, the transmission/insertion losses of the arms 220, and/or an uneven split ratio at the output 230.

As illustrated herein, $A_{ma}$ is equal to $A_{mb}$, but in other embodiments $A_{ma}$ may be unequal to $A_{mb}$ to account for an uneven split ratio at the output 230, or to provide an output signal 270 with an amplitude $A_o$ that satisfies an extinction ratio threshold (relative to Ai), but that induces smaller losses on the partial signals 250 (and requires correspondingly less power to implement).

A user or manufacturer may specify extinction ratio thresholds and loss thresholds that the PE 150 is to satisfy, and may also specify how the PE 150 is to be calibrated within those thresholds to prioritize how the voltage to an active intensity modulator 222 is set. For example, an intensity modulator 222 supplied with X Volts may provide a PE 150 with an extinction ratio of 0.02 and with an induced loss of 0.2 dB, and that same intensity modulator 222 may provide the PE 150 with an extinction ratio of 0.2 and with an induced a loss of 0.02 dB when supplied Y Volts. If the extinction ratios and induced losses for both voltage X and voltage Y satisfy the associated thresholds, a calibration specification may indicate which voltage of X and Y is to be selected for use, or if (and how) a voltage between X and Y is to be selected for use.

Figure 3:
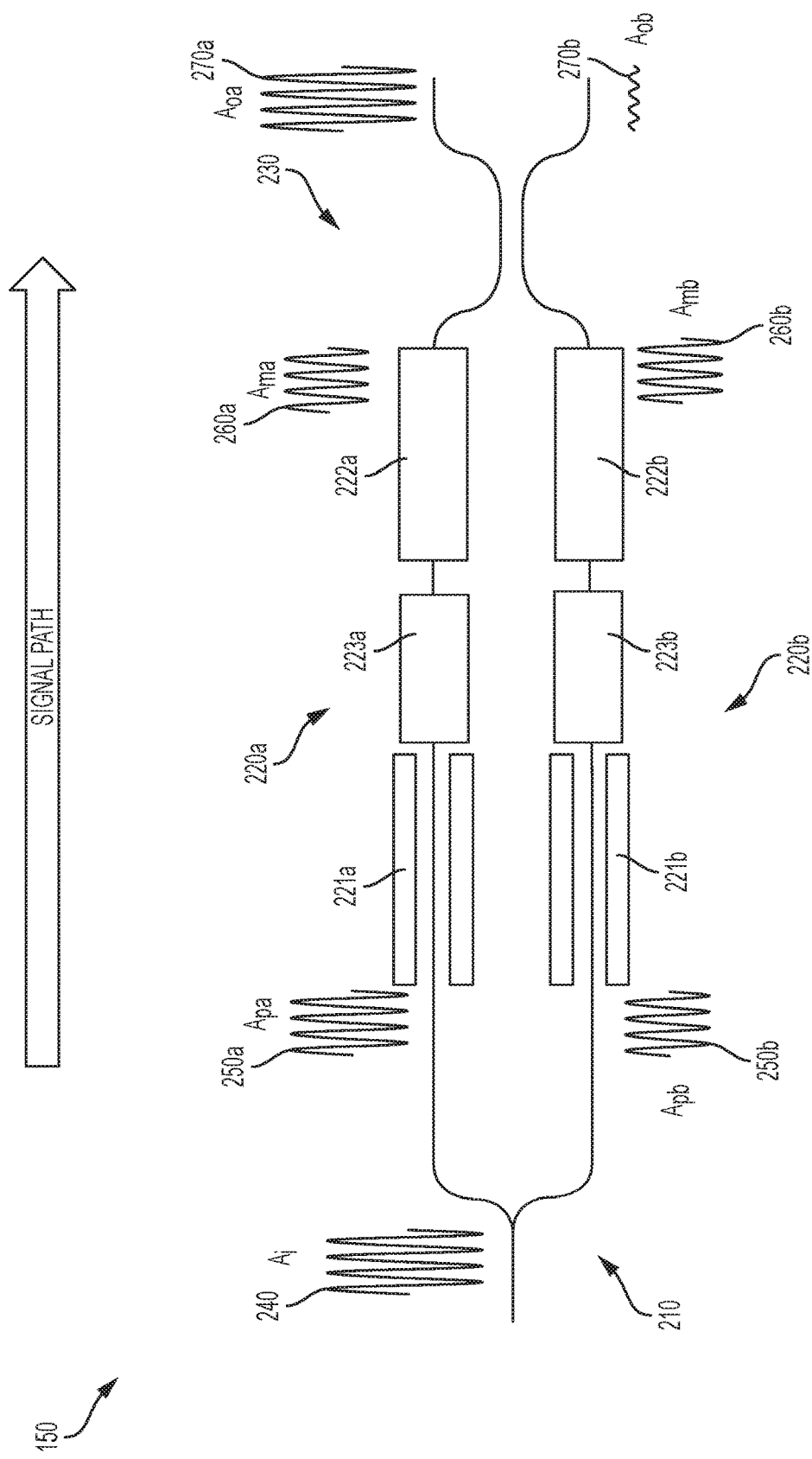
FIG. 3 illustrates an example photonic element with one input and multiple outputs according to an aspect of the present disclosure.

FIG. 3 illustrates an example PE 150 with one input 210 and multiple paths at the output 230. The input 210 of the example PE 150 in FIG. 3 is a Y-splitter (in a 1:2 ratio), and the output 230 is a 2:2 switch. Between the input 210 and the output 230, are two arms 220, each with a phase shifter 221, a high-speed modulator 223, and an intensity modulator 222.

An input signal 240 of amplitude $A_i$ is received at the input 210 and is split onto the first arm 220a as a first partial signal 250a with an amplitude $A_{pa}$ and is split onto the second arm 220b as a second partial signal 250b with an amplitude of $A_{pb}$. As illustrated, $A_{pa}$ is greater than $A_{pb}$, and are phase aligned with one another. One or both of the first phase shifter 221a and the second phase shifter 221b may induce a phase offset between the first partial signal 250a and the second partial signal 250b. Similarly, (if included) one or both of the first high-speed modulator 223a and the second high-speed modulator 223b may induce a phase offset between the high-frequency components of the first partial signal 250a and the second partial signal 250b.

During operation, one of the first intensity modulator 222a and the second intensity modulator 222b are provided a voltage to induce a loss in one of the partial signals 250. The first arm 220a provides a first matched signal 260a (generally, matched signal 260) of amplitude $A_{ma}$ to the output 230, and the second arm 220b provides a second matched signal 260b of amplitude $A_{mb}$ to the output 230 to be combined into a first output signal 270a (generally output signal 270) of amplitude $A_{oa}$ and a second output signal 270b of amplitude $A_{ob}$. One of the intensity modulators 222 may induce a loss into a respective partial signal 250 to account for an uneven split ratio at the input 210 of the input signal 240, the transmission/insertion losses of the arms 220, and an uneven split ratio at the output 230.

As illustrated herein, $A_{ma}$ is equal to $A_{mb}$, but in other embodiments $A_{ma}$ may be unequal to $A_{mb}$ to account for an uneven split ratio at the output 230, or to provide output signals 270 with amplitudes $A_{oa}$ and $A_{ob}$ that all satisfy an extinction ratio threshold (relative to Ai), but that induce smaller losses on the partial signals 250 (and requires correspondingly less power to implement).

The output 230 in FIG. 3 may specify which output path carries a recombined signal (i.e., on which the matched signals 260 re-constitute the input signal 240) and which output path carries an extinguished signal (i.e., on which the match signals 260 cancel one another out). In the illustrated example, the first output pathway carries a first output signal 270a of the recombined signal (with amplitude $A_{oa}$ as close to $A_i$ as possible) and the second pathway carries a second output signal 270b of the extinguished signal (with amplitude $A_{ob}$ as close to 0 amplitude as possible). For example, when a first pathway of the output 230 that carries the first output signal 270a is active, the output 230 switches to provide $A_{oa}$ at a maximum amplitude and $A_{ob}$ at a minimum amplitude. In contrast, when a second pathway of the output 230 that carries the second output signal 270b is active, the output 230 switches to provide $A_{ob}$ at a maximum amplitude and $A_{oa}$ at a minimum amplitude. Depending on the physical characteristics of the output 230, the differences between actual and nominal values at each pathway may be different; that is, in some instances, $\Delta(A_i, A_{oa}) \neq \Delta(A_i, A_{oa})$ and/or $\Delta(0, A_{ob}) \neq \Delta(0, A_{ob})$. Therefore, a configuration system may set the voltage provided to an active intensity modulator 222 to the voltage associated with a maximum extinction at one of the pathways, the voltage associated with a lowest loss at one of the pathways, or an intermediate voltage based on the prior voltages so that each of the amplitudes on each of the pathways to meet specified thresholds for loss and/or extinction.

Figure 4:
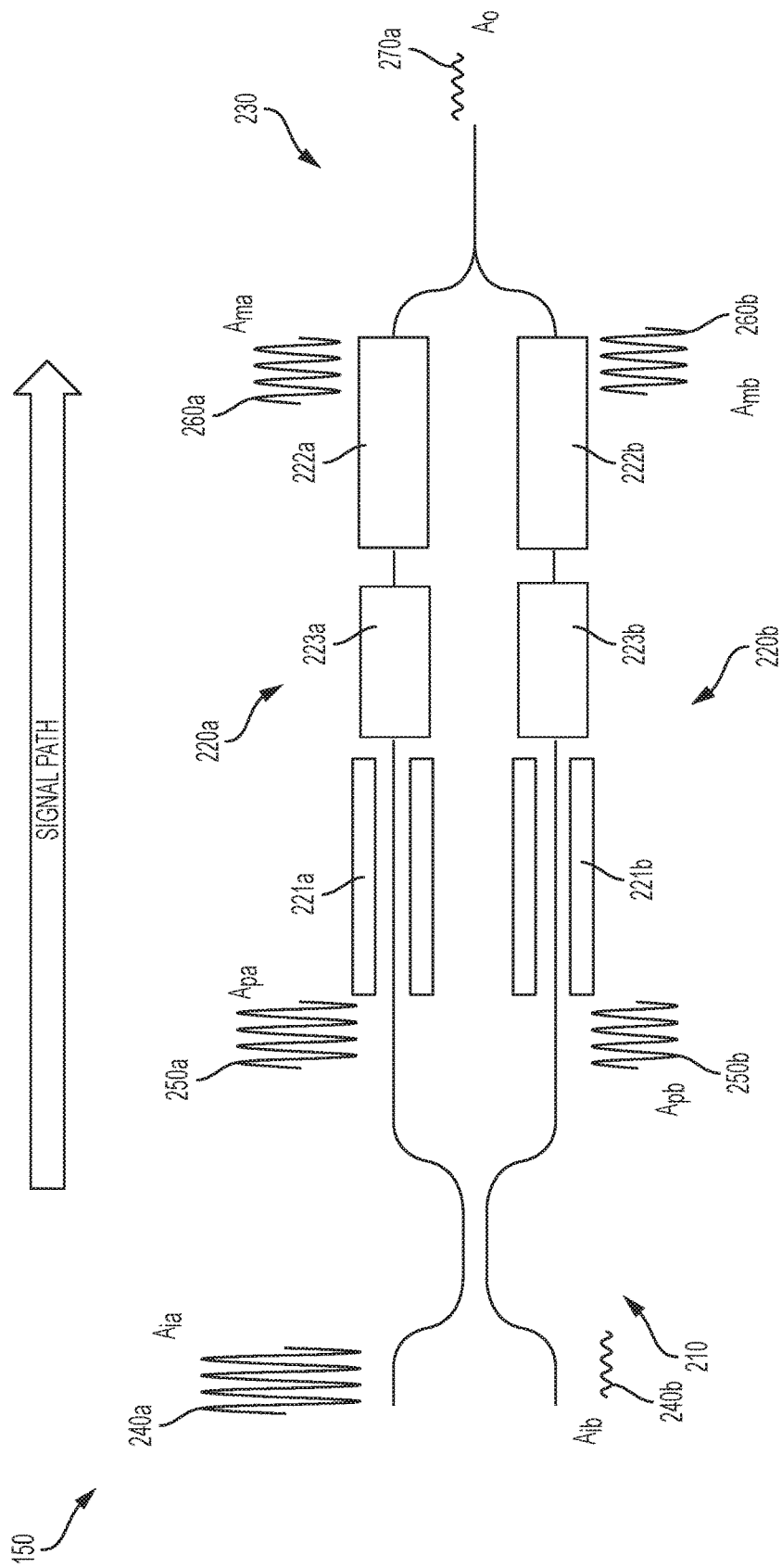
FIG. 4 illustrates an example photonic element with multiple inputs and one output according to an aspect of the present disclosure.

FIG. 4 illustrates an example PE 150 with multiple inputs 210 and one output 230. The input 210 of the example PE 150 in FIG. 4 is a 2:2 switch, and the output 230 is a Y-combiner (in a 2:1 ratio). Between the input 210 and the output 230, are two arms 220, each with a phase shifter 221, a high-speed modulator 223, and an intensity modulator 222.

The input 210 in FIG. 4 allows the PE 150 to specify one of two pathways, carrying either a first input signal 240a (generally, input signal 240) with amplitude $A_{ia}$ or a second input signal 240b with an amplitude $A_{ib}$ is split and transmitted over the arms 220. For example, when the first pathway of the input 210 is active, the first input signal 240a is split into the first partial signal 250a and the second partial signal 250b. In contrast, when the second pathway of the input 210 is active, the second input signal 240b is split into the first partial signal 250a and the second partial signal 250b. Although $A_{ia}$ and $A_{ib}$ are illustrated at different amplitudes, $A_{ia}$ and $A_{ib}$ may be set to various amplitudes in various embodiments. For example, a first signal source may provide the first input signal 240a and a second signal source may provide the second signal source 240b, and the input 210 controls which particular input signal 240 is transmitted to the output 230.

The selected input signal 240 is split onto the first arm 220a as a first partial signal 250a with an amplitude $A_{pa}$ and is split onto the second arm 220b as a second partial signal 250b with an amplitude of $A_{pb}$. As illustrated, $A_{pa}$ is greater than $A_{pb}$, and are phase aligned with one another. One or both of the first phase shifter 221a and the second phase shifter 221b may induce a phase offset between the first partial signal 250a and the second partial signal 250b. Similarly, (if included) one or both of the first high-speed modulator 223a and the second high-speed modulator 223b may induce a phase offset between the high-frequency components of the first partial signal 250a and the second partial signal 250b.

During operation, one of the first intensity modulator 222a and the second intensity modulator 222b are provided a voltage to induce a loss in one of the partial signals 250. The first arm 220a provides a first matched signal 260a (generally, matched signal 260) of amplitude $A_{ma}$ to the output 230, and the second arm 220b provides a second matched signal 260b of amplitude $A_{mb}$ to the output 230 to be combined into an output signal 270 of amplitude $A_o$. One of the intensity modulators 222 may induce a loss into a respective partial signal 250 to account for an uneven split ratio at the input 210 of the input signal 240, the transmission/insertion losses of the arms 220, and an uneven split ratio at the output 230.

As illustrated herein, $A_{ma}$ is equal to $A_{mb}$, but in other embodiments $A_{ma}$ may be unequal to $A_{mb}$ to account for an uneven split ratio at the output 230, or to provide an output signal 270 with an amplitude $A_o$ that satisfies an extinction ratio threshold (relative to $A_i$), but that induces smaller losses on the partial signals 250 (and requires correspondingly less power to implement).

A controller may set the voltage provided to the active intensity modulator 222 (of the two intensity modulators 222) to account for split ratios at the output 230, losses in the arms 220, and differences in the multiple pathways of the input 220. For example, when the first signal 240a is carried on the arms 220, the controller may measure a first extinction ratio and a first loss rate for $A_o$ and $A_{ia}$, but when the second signal 240b is carried on the arms 220, the controller may measure a second extinction ratio and a second loss rate for $A_o$ and $A_{ib}$. In various embodiments, the controller may use thresholds to select the voltage for the intensity modulator 222 that produces the best extinction ratio between $A_o$ and $A_{ia}$ based on the first input signal 240a or the best extinction ratio between $A_o$ and $A_{ib}$ based on the second input signal 240b. In other embodiments, the controller may use thresholds to select the voltage for the intensity modulator 222 that produces the lowest losses between $A_o$ and $A_{ia}$ based on the first input signal 240a or the lowest losses ratio between $A_o$ and $A_{ib}$ based on the second input signal 240b. In further embodiments, the controller may set an intermediate voltage between those associated with the maximum extinction or lowest losses for a given input pathway so that the extinction/loss thresholds associated with the signals carried from the other input pathway may be satisfied.

Figure 5:
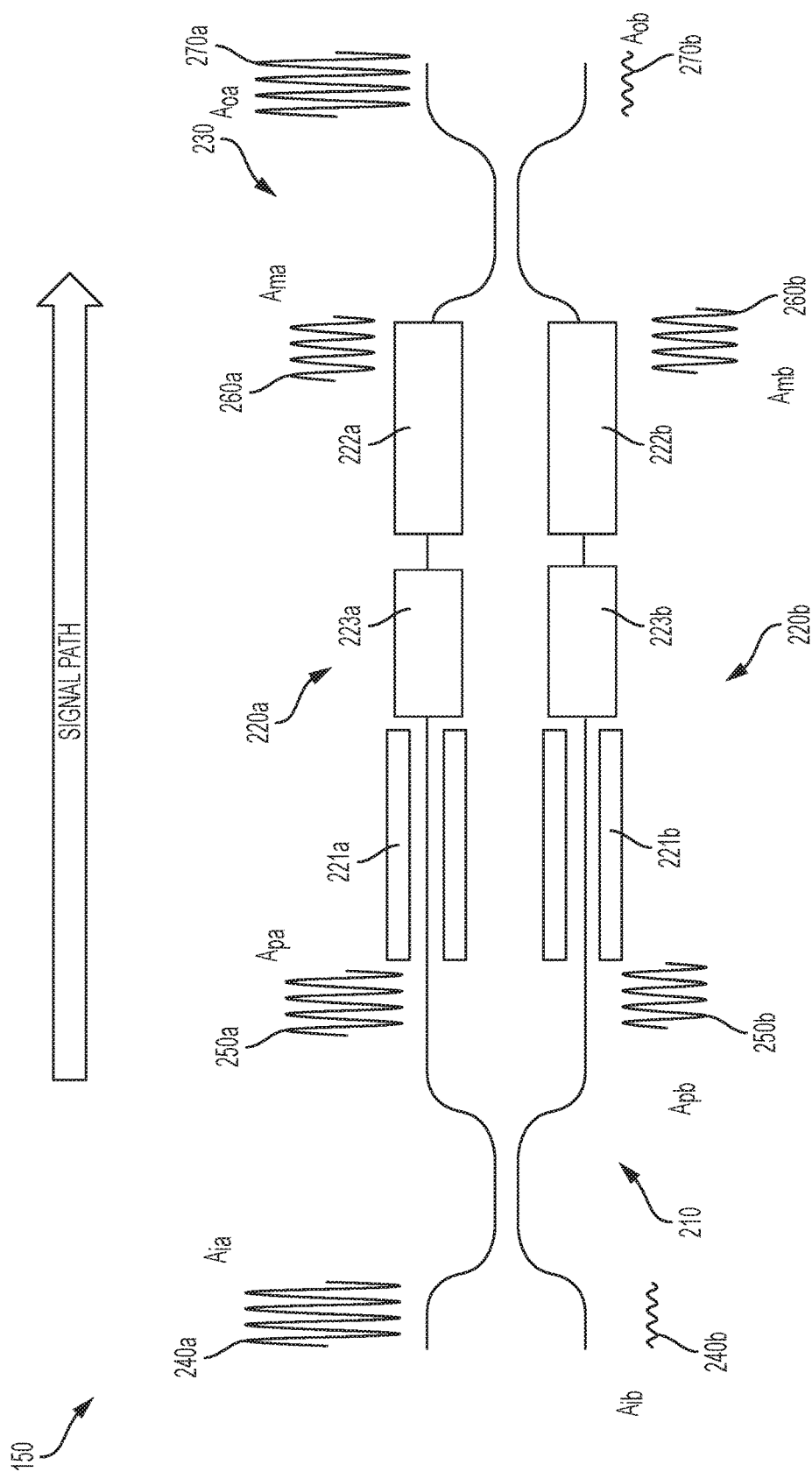
FIG. 5 illustrates an example photonic element with multiple inputs and multiple outputs according to an aspect of the present disclosure.

FIG. 5 illustrates an example PE 150 with multiple inputs 210 and multiple outputs 230. The input 210 of the example PE 150 in FIG. 5 is a 2:2 switch, and the output 230 is a 2:2 switch. Between the input 210 and the output 230, are two arms 220, each with a phase shifter 221, a high-speed modulator 223, and an intensity modulator 222.

The input 210 in FIG. 5 allows the PE 150 to specify one of two pathways, carrying either a first input signal 240a (generally, input signal 240) with amplitude $A_{ia}$ or a second input signal 240b with an amplitude $A_{ib}$ is split and transmitted over the arms 220. For example, when the first pathway of the input 210 is active, the first input signal 240a is split into the first partial signal 250a and the second partial signal 250b. In contrast, when the second pathway of the input 210 is active, the second input signal 240b is split into the first partial signal 250a and the second partial signal 250b. Although $A_{ia}$ and $A_{ib}$ are illustrated at different amplitudes, $A_{ia}$ and $A_{ib}$ may be set to various amplitudes in various embodiments. For example, a first signal source may provide the first input signal 240a and a second signal source may provide the second signal source 240b, and the input 210 controls which particular input signal 240 is transmitted to the output 230.

The selected input signal 240 is split onto the first arm 220a as a first partial signal 250a with an amplitude $A_{pa}$ and is split onto the second arm 220b as a second partial signal 250b with an amplitude of $A_{pb}$. As illustrated, $A_{pa}$ is greater than $A_{pb}$, and are phase aligned with one another. One or both of the first phase shifter 221a and the second phase shifter 221b may induce a phase offset between the first partial signal 250a and the second partial signal 250b. Similarly, (if included) one or both of the first high-speed modulator 223a and the second high-speed modulator 223b may induce a phase offset between the high-frequency components of the first partial signal 250a and the second partial signal 250b.

During operation, one of the first intensity modulator 222a and the second intensity modulator 222b are provided a voltage to induce a loss in one of the partial signals 250. The first arm 220a provides a first matched signal 260a (generally, matched signal 260) of amplitude $A_{ma}$ to the output 230, and the second arm 220b provides a second matched signal 260b of amplitude $A_{mb}$ to the output 230 to be combined into an output signal 270 of amplitude $A_o$. One of the intensity modulators 222 may induce a loss into a respective partial signal 250 to account for an uneven split ratio at the input 210 of the input signal 240, the transmission/insertion losses of the arms 220, and an uneven split ratio at the output 230.

As illustrated herein, $A_{ma}$ is equal to $A_{mb}$, but in other embodiments $A_{ma}$ may be unequal to $A_{mb}$ to account for an uneven split ratio at the output 230, or to provide output signals 270 with amplitudes $A_{oa}$ and $A_{ob}$ that all satisfy an extinction ratio threshold (relative to $A_i$), but that induce smaller losses on the partial signals 250 (and requires correspondingly less power to implement).

The output 230 in FIG. 5 may specify which output path carries a recombined signal (i.e., on which the matched signals 260 re-constitute the input signal 240) and which output path carries an extinguished signal (i.e., on which the match signals 260 cancel one another out). In the illustrated example, the first output pathway carries a first output signal 270a of the recombined signal (with amplitude $A_{oa}$ as close to the $A_i$ of the selected input signal 240a or 240b as possible) and the second pathway carries a second output signal 270b of the extinguished signal (with amplitude $A_{ob}$ as close to 0 amplitude as possible). For example, when a first pathway of the output 230 that carries the first output signal 270a is active, the output 230 switches to provide $A_{oa}$ at a maximum amplitude and $A_{ob}$ at a minimum amplitude. In contrast, when a second pathway of the output 230 that carries the second output signal 270b is active, the output 230 switches to provide $A_{ob}$ at a maximum amplitude and $A_{oa}$ at a minimum amplitude. Depending on the physical characteristics of the output 230, the differences between actual and nominal values at each pathway may be different; that is, in some instances, $\Delta(A_i, A_{oa}) \neq \Delta(A_i, A_{oa})$ and/or $\Delta(0, A_{ob}) \neq \Delta(0, A_{ob})$. Therefore, a configuration system may set the voltage provided to an active intensity modulator 222 to the voltage associated with a maximum extinction at one of the pathways, the voltage associated with a lowest loss at one of the pathways, or an intermediate voltage based on the prior voltages so that each of the amplitudes on each of the pathways to meet specified thresholds for loss and/or extinction.

Figure 6:
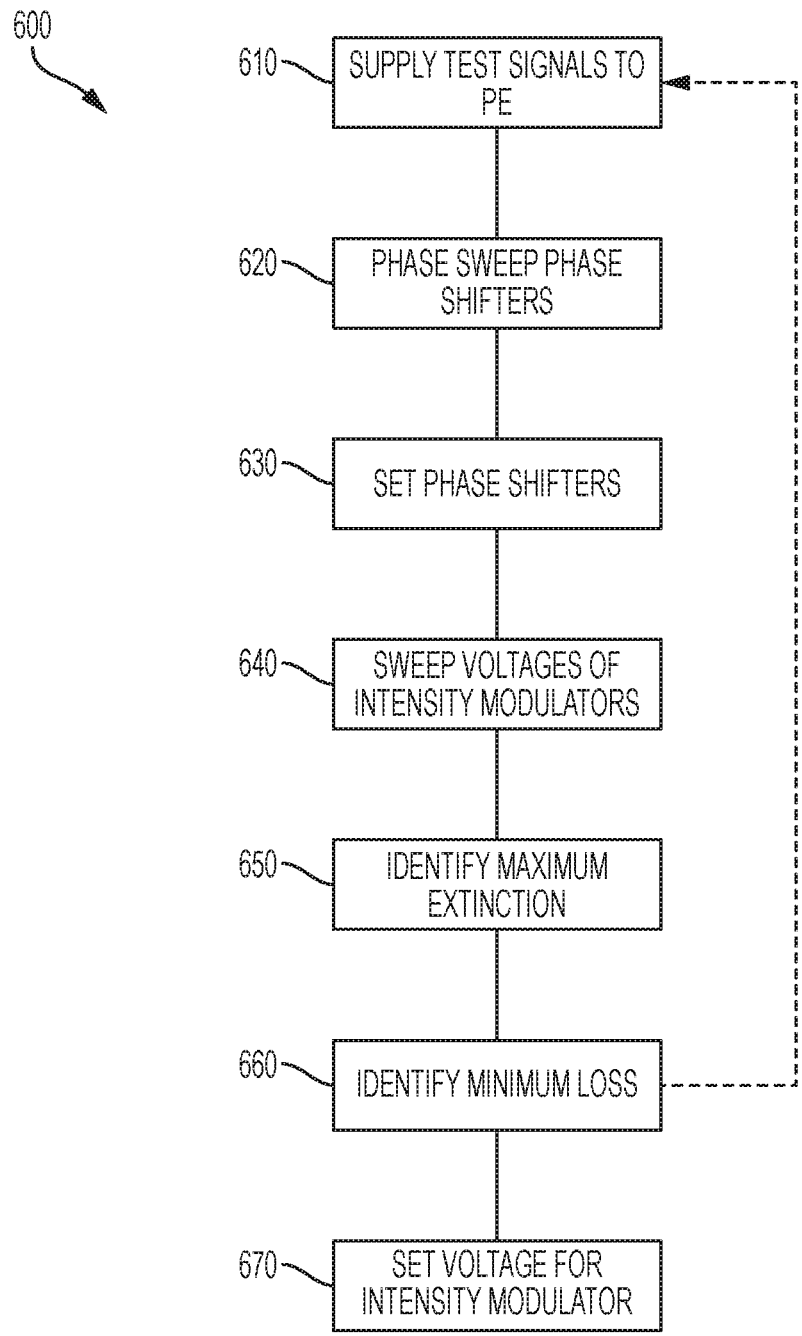
FIG. 6 is a flowchart illustrating general operations of a method for calibrating a photonic element for improving extinction ratios according to an aspect of the present disclosure.

FIG. 6 is a flowchart illustrating general operations of a method 600 for calibrating a PE 150 for improving extinction ratios. Method 600 may be performed as part of a Built-In Self-Test (BIST) or calibration procedure for an IC, or may be performed separately from other calibration and test procedures. In various embodiments, an internal processor or logic controller built into an IC in which the PE 150 is included may control the operations within method 600. In other embodiments, an external processor or logic controller that is part of a test machine in communication with the PE 150 may control the operations of method 600.

Method 600 begins at block 610, where the processor provides one or more test signals of known phase, wavelength, and amplitude to the PE 150. The processor may control which input 210 or output 230 is active in a multiple input/output PE 150, and will monitor the amplitudes of the output test signals against the input test signals to determine various extinction ratios ($r_e$) throughout method 600.

At block 620, the processor signals the phase shifters 221 and high-speed modulators 223 on each arm 220 in turn to sweep through the available phases. The processor may signal one or both phase shifters 221 and/or high-speed modulators 223 to adjust an amount of phase offset imparted on the split test signal so that the test signal carried in the first arm 220a of the PE 150 is offset by $1\pi$ radians from the test signal carried in the second arm 220b. Offsetting the phase of the signal carried by the first arm 220a by $1\pi$ radians from the test signal carried by the second arm 220*b* will allow the test signals, when recombined at the output 230, to cancel each other out. Once phase positions for the phase shifters 221 and/or high-speed modulators 223 that are offset by 1π are identified, method 600 proceeds to block 230, where the processor sets the phase shifters 221 and/or high-speed modulators 223 to the identified phase positions.

At block 640, the processor controls an amount of voltage provided to the intensity modulators 222 and sweeps through the available voltages. During the voltage sweep, the processor identifies, at block 650, the voltage ($V_{re-max}$) supplied to one of the intensity modulators 222 that corresponds to the maximum extinction of the test signal at the output 230. The processor also identifies during the voltage sweep, at block 660, the voltage ($V_{loss-min}$) supplied to one of the intensity modulators that corresponds to a minimum power loss in the signal (e.g., the output test signal that has an amplitude closest to the amplitude of the input test signal).

As only one intensity modulator 222 (or the active part thereof) is powered during operation of the PE 150, the processor may test each intensity modulator 222 one at a time across the available voltage inputs. In some embodiments, the processor identifies the arm 220 on which the test signal of the higher amplitude is carried and only sweeps through the input voltages for the intensity modulator 222 for that arm 220. In further embodiments, the processor sweeps through input voltages for a given intensity modulator 222 until an extinction ratio is identified as increasing from prior-tested input voltages. In other embodiments, the processor sweeps through all available input voltages for one or more of the intensity modulators 222.

In some embodiments, method 600 returns to block 610 from block 660, where the processor activates a different input 210 or output 230 (or combination thereof) to determine test characteristics for different components in the PE 150. In additional embodiments, method 600 returns to block 610 from block 660, where the processor provides test signals of different known phases, wavelengths, amplitudes than test signals that were previously evaluated. In embodiments that return to block 610, block 620 and block 630 may be omitted from method 600 after being performed once.

In embodiments that identify multiple values for $V_{re-max}$ and/or $V_{loss-min}$ (e.g., calibrating with test signals with different characteristics or over different pathways through the PE 150), the processor may retain separate values for each calibration setup, or may average values across calibration setups. For example, if the processor is instructed to calibrate the PE 150 with three test signals having different wavelengths, $V_{re-max}$ for the first signal may be A volts, for the second signal may be B volts, and for the third signal may be C volts. In some embodiments, the processor may retain each value of A, B, and C as individual values of $V_{re-max}$ that are associated with the tested wavelengths. In other embodiments, the processor combines the values of A, B, C into an aggregate $V_{re-max}$ (e.g., as a mean value, a wavelength biased mean value, a median value, a linear or curvilinear formula for $V_{re-max}$ based on wavelength). The multiple identified values for $V_{loss-min}$ may also be retained individually or in aggregate.

When the processor has observed the performance of each input 210, output 230, and test signal type specified for calibration, method 600 proceeds to block 670. At block 670 the processor sets the voltage for one of the intensity modulators 222 with respect to the identified voltage $V_{re-max}$ associated with the greatest identified extinction ratio (per block 650), and the identified voltage $V_{loss-min}$ associated with the lowest identified losses in signal strength (per block 660) according to a calibration specification for the PE 150. The calibration specification determines what voltage the processor will set the intensity modulator 222 to with respect to minimum extinction ratios for each output 230, a maximum allowable signal loss across the PE 150, a preference for lower losses or greater extinction ratios at one or more outputs 230, and the like. In embodiments that are calibrated for multiple inputs 210 or outputs 230, or that are calibrated with multiple test signals, the calibration specification may indicate separate thresholds for $r_e$ or loss for different pathways or signal characteristics.

Several PEs 150 that are calibrated according to different specifications may have identical values for each of $V_{re-max}$ and $V_{loss-min}$ and the processor sets the respective intensity modulators 222 of the several PEs to different values based on the different specifications. In a first example, a PE 150 set according to a specification for a greatest available extinction ratio will have one intensity modulator 222 set to $V_{re-max}$. In a second example, a PE 150 set according to a specification for a lowest available signal strength loss has one intensity modulator 222 set to $V_{loss-min}$. In a third example, a PE 150 set according to a specification for a greatest available extinction ratio with a signal strength loss above a threshold value may have the processor set the intensity modulator 222 to a voltage between $V_{re-max}$ and $V_{loss-min}$. In a fourth example, a PE 150 set according to a specification for a greatest available extinction ratio for signals of wavelength $\lambda_A$ and for signals of wavelength $\lambda_B$, may have the processor set the intensity modulator 222 to a voltage between the values of $V_{re-max}$ associated with $\lambda_A$ and $\lambda_B$. In embodiments that set the voltage to the intensity modulator 222 to a value other than $V_{re-max}$ and $V_{loss-min}$, a linear or curvilinear equation based at least in part on $V_{re-max}$ and $V_{loss-min}$ may be used to select the voltage.

In the event that the processor cannot determine a voltage to satisfy each threshold set in the calibration specification, the PE 150 may be failed.

Once the intensity modulator 222 for the PE 150 has been set and the PE 150 has passed calibration, or the PE 150 has failed calibration, method 600 may then conclude.

Embodiments of the present disclosure are described with reference to flowchart illustrations and/or block diagrams of methods, apparatuses (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods, and computer program products according to various embodiments. In this regard, each block in the flowchart or block diagrams may represent a module, segment or portion of code, which comprises one or more executable instructions for implementing the specified logical function(s). It should also be noted that, in some other implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A Photonic Element (PE), comprising:
an input, configured to receive an input optical signal and split the input optical signal into a first partial signal and a second partial signal;
a first arm connected to the input and configured to receive the first partial signal, the first arm including:
a first phase shifter; and
a first intensity modulator configured to provide a first matched signal based on the first partial signal;
a second arm connected to the input and configured to receive the second partial signal, including:
a second phase shifter, wherein the second phase shifter is configured to operate with the first phase shifter to phase offset the first partial signal relative to the second partial signal; and
a second intensity modulator configured to provide a second matched signal based on the second partial signal, wherein only the second intensity modulator is provided power to actively reduce the second matched signal from the second partial signal to an amplitude of the first matched signal; and
an output, connected to the first arm and the second arm and configured to combine the first matched signal and the second matched signal to provide an output signal with an amplitude below an extinction ratio threshold.

2. The PE of claim 1, wherein the first intensity modulator includes a first active portion and a first passive portion, wherein the second intensity modulator includes a second active portion and a second passive portion.

3. The PE of claim 1, wherein the input includes a first input pathway and a second input pathway, wherein the input is configured to switch between the first input pathway and the second input pathway to receive the input optical signal from one of the first input pathway and the second input pathway.

4. The PE of claim 1, wherein the output includes a first output pathway and a second output pathway, wherein the output is configured to provide the output signal over the first output pathway as a recombined signal and to provide the output signal over the second output pathway as an extinguished signal.

5. The PE of claim 4, wherein the input includes a first input pathway and a second input pathway, wherein the input is configured to switch between the first input pathway and the second input pathway to receive the input optical signal from one of the first input pathway and the second input pathway.

6. The PE of claim 4, wherein the output is further configured to switch to provide the output signal over the second output pathway as the recombined signal and to provide the output signal over the first output pathway as the extinguished signal.

7. A Photonic Element (PE) comprising:
a first arm in parallel with a second arm, wherein the first arm is configured to carry a first signal to combine with a second signal carried by the second arm;
a phase shifter disposed in the first arm, configured to offset a phase of the first signal by $1\pi$ radians relative to the second signal;
an intensity modulator disposed in the first arm, configured to induce an amplitude loss in the first signal such that when the first signal is combined with the second signal a resulting combined signal has an amplitude below an extinction ratio threshold; and
a second intensity modulator disposed in the second arm that is not actively powered.

8. The PE of claim 7, wherein the intensity modulator is disposed in the first arm upstream of the phase shifter.

9. The PE of claim 7, wherein the intensity modulator is configured to induce the amplitude loss in the first signal according to a predefined voltage determined during a calibration process to match amplitude losses in the second arm.

10. A Photonic Element (PE) comprising:
a first arm in parallel with a second arm, wherein the first arm is configured to carry a first signal to combine with a second signal carried by the second arm;
a phase shifter disposed in the first arm, configured to offset a phase of the first signal by $1\pi$ radians relative to the second signal;
an intensity modulator disposed in the first arm, configured to induce an amplitude loss in the first signal such that when the first signal is combined with the second signal a resulting combined signal has an amplitude below an extinction ratio threshold, wherein the intensity modulator is configured to induce the amplitude loss in the first signal according to a predefined voltage determined during a calibration process to match amplitude losses in the second arm.

11. The PE of claim 10, wherein the intensity modulator is disposed in the first arm upstream of the phase shifter.

12. The PE of claim 10, further comprising:
a second intensity modulator disposed in the second arm that is not actively powered.

* * * * *